US012619577B2

(12) United States Patent
Ni et al.

(10) Patent No.: US 12,619,577 B2
(45) Date of Patent: May 5, 2026

(54) METHOD AND APPARATUS FOR FREE SPACE MANAGEMENT

(71) Applicant: HUAWEI TECHNOLOGIES CO., LTD., Guangdong (CN)

(72) Inventors: Mingkun Ni, Markham (CA); Ronen Grosman, Markham (CA); Kelvin Ho, Markham (CA); Kristian Robert Lejao, Seattle, WA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/540,078

(22) Filed: Dec. 14, 2023

(65) Prior Publication Data

US 2025/0200005 A1     Jun. 19, 2025

(51) Int. Cl.
*G06F 16/17* (2019.01)

(52) U.S. Cl.
CPC ................................. *G06F 16/1727* (2019.01)

(58) Field of Classification Search
CPC .................................................. G06F 16/1727
See application file for complete search history.

(56) References Cited

U.S. PATENT DOCUMENTS 6,668,263 B1 * 12/2003 Cranston ............... G06F 16/284
6,874,004 B2 * 3/2005 Jolly ................... G06F 11/1008
                                                      711/170

2008/0183748 A1 * 7/2008 Kamat ................ G06F 16/2219
2015/0302026 A1 * 10/2015 Nam ...................... G06F 16/183
                                                      707/827

FOREIGN PATENT DOCUMENTS

CN          1878107 A      12/2006

OTHER PUBLICATIONS

The PostgreSQL Global Development Group, "PostgreSQL 14", Section 70.3. Free Space Map, https://web.archive.org/web/20220120152610/https://www.postgresql.org/docs/current/storage-fsm.html (Year: 2022).*
International Searching Authority (ISA): International Search Report (ISR) and the Written Opinion of the International Searching Authority for International Application No. PCT/CN2024/138648, mailing date: Feb. 19, 2025, 8 pages.

* cited by examiner

*Primary Examiner* — Khanh B Pham
*Assistant Examiner* — Brooks T Hale
(74) *Attorney, Agent, or Firm* — Moffat & Co

(57) ABSTRACT

There is provided a method and apparatus for free space management in a distributed database. Each datanode of the database is assigned a free space map to manage free space. When a datanode requires additional storage space, a new free space map may be assigned to the datanode, a free space map of a different datanode may be shared with the datanode, or a free space map of a different datanode may be reassigned to the datanode. A background process may be used to recycle inactive free space maps.

23 Claims, 11 Drawing Sheets

METHOD AND APPARATUS FOR FREE SPACE MANAGEMENT

OTHER APPLICATIONS

The present application is the first application for this disclosure.

TECHNICAL FIELD

The present disclosure relates to free space management. Specifically, the present disclosure relates to a method of managing free space allocations in a multi-datanode database.

BACKGROUND

Multi-datanode databases conventionally use one of two architectures for data management, namely the shared-nothing architecture and the shared-everything architecture.

In a shared-nothing architecture, each data node may modify its own independent set of files on disk without any negotiations with other nodes. In contrast, in a shared-everything architecture, each data node shares an allocation table with the other nodes. While this requires data nodes to negotiate with other nodes when making modifications, it also allows each data node to access any file within the database.

SUMMARY

It is an object of the present disclosure to provide a method for distributed free space management in a database.

According to a first aspect, there is provided a method for managing free space in a distributed database, comprising issuing a request for a page from a first datanode of the distributed database, determining that the first datanode is not associated to a free space map that can fulfill the request, selecting a free space map from a plurality of free space maps from other datanodes of the distributed database, associating the selected free space map to the first datanode, and responding to the request based on the selected free space map.

According to another aspect, there is provided a computing device for managing free space in a distributed database, comprising a processor and memory, wherein the computing device is configured to issue a request for a page from a first datanode of the distributed database, determine that the first datanode is not associated to a free space map that can fulfill the request, select a free space map from a plurality of free space maps from other datanodes of the distributed database, associate the selected free space map to the first datanode, and respond to the request based on the selected free space map.

According to yet another aspect, there is provided a computer readable medium having stored thereon executable code for execution by a processor of a computing device, the executable code comprising instructions for issuing a request for a page from a first datanode of the distributed database, determining that the first datanode is not associated to a free space map that can fulfill the request, selecting a free space map from a plurality of free space maps from other datanodes of the distributed database, associating the selected free space map to the first datanode, and responding to the request based on the selected free space map.

BRIEF DESCRIPTION OF THE DRAWINGS

The present disclosure will be better understood with reference to the drawings in which.

DETAILED DESCRIPTION

The present disclosure is directed to a method and apparatus for distributed free space management in a database.

Throughout this disclosure, the present terms are given the following definitions.

Free Space Management: system in a database providing a lookup for pages with free space.

Datanode: A machine or host in a multi-node database architecture that has access to the on-disk database files for reading and writing.

Coordinator Node: A machine or host in a multi-node database architecture that manages query parsing and distribution and controls transaction progress.

Transactions Per Minute (TPMC): A performance index used in the Transaction Processing Performance Council Benchmark C (TPC-C) test, which is a widely used method to evaluate the performance of distributed database systems.

A distributed database generally comprises a plurality of datanodes running simultaneously, each datanode being responsible for computing and storing user data. Each datanode comprises at least one thread, called the "backend", for handling client queries received through a connection from a client device.

Data in a distributed database is stored in relations. Relations have a table structure, comprising rows and columns of cells, where each cell stores one piece of data. Relations are stored on pages, which is the minimum data structure used for data storage. A page comprises a data block of a fixed size. For example, in PostgreSQL™ and Gaussdb™ systems, each page has 8192 bytes.

A page may be completely filled with data, but others may be partially filled. A Free Space Map (FSM) is used to keep track of what space remains free on each page. The use of an FSM ensures that a datanode does not waste unused storage space.

An FSM comprises a data structure which records the size of free space on each data page. The FSM may be searched to obtain a page based on a requested amount of free space. For example, if a client wishes to insert a row whose size is 2000 Bytes into a relation, the corresponding backend may search the FSM of the relation and receive a page with at least 2000 bytes of free space.

Figure 1:
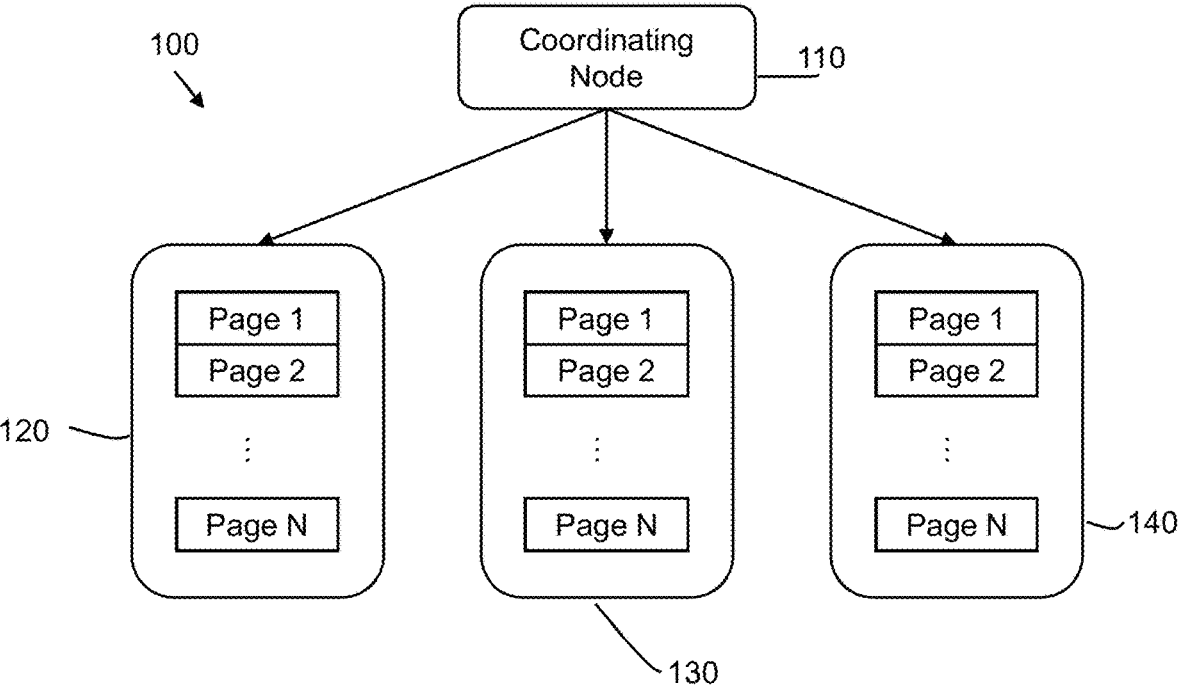
FIG. 1 is a graphical representation of a shared-nothing architecture.

Reference is now made to FIG. 1 which illustrates a distributed database with a shared-nothing architecture.

As seen in FIG. 1, database 100 comprises a coordinating node 110, and shards 120, 130, and 140. Shards 120, 130, and 140 are sections of a large allocation table. For example, the allocation table may comprise 1 billion entries, shard 120 may include entries 1 to 300 million, shard 130 may include entries 300 million to 600 million, and shard 140 may include entries 600 million to 1 billion.

Moreover, shards 120, 130, and 140 are associated to their respective datanode. For example, a first datanode may be associated to shard 120, a second datanode may be associated to shard 130, and a third datanode may be associated to shard 140.

As a transaction request is received by coordinator node 110, the transaction is forwarded to datanodes whose shards are related to this transaction to process. As each datanode is associated to their respective shard, no conflict occurs regardless of the order of the transactions. Moreover, each shard may be stored on individual disks, allowing for transactions to occur simultaneously.

Figure 2:
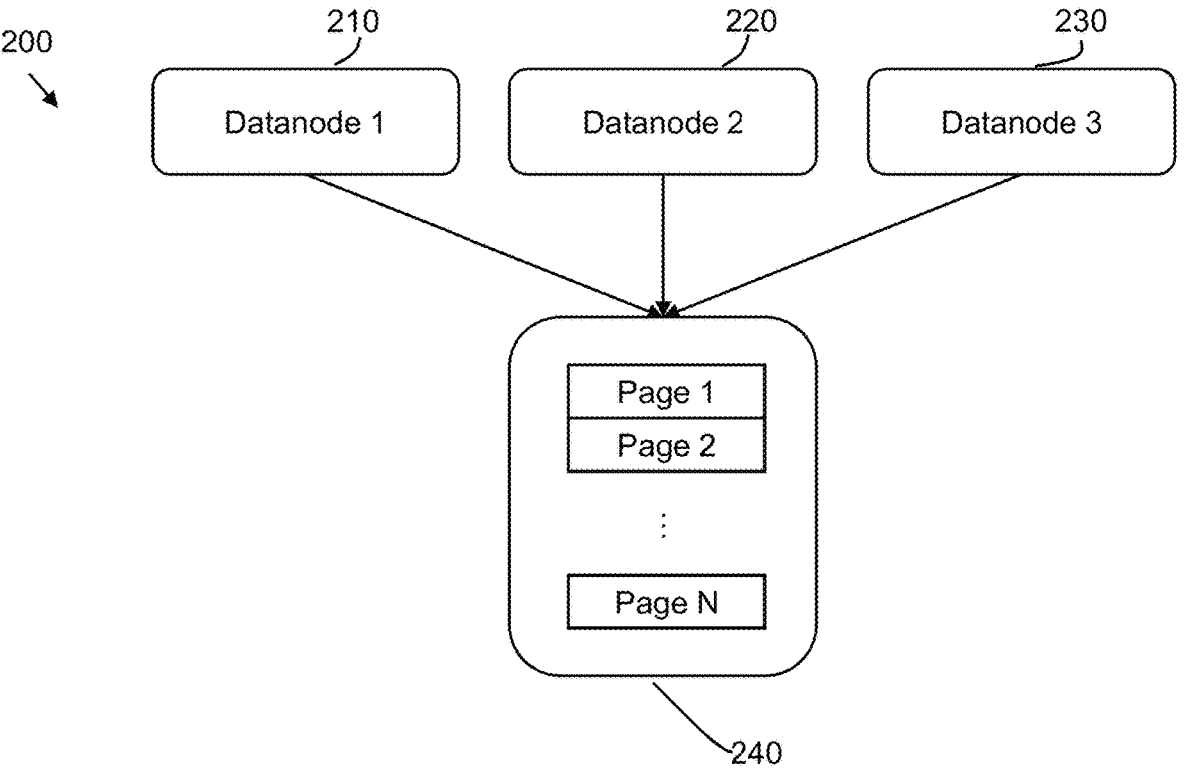
FIG. 2 is a graphical representation of a shared-everything architecture.

Reference is now made to FIG. 2 which illustrates a distributed database with a shared-everything architecture.

As seen in FIG. 2, database 200 comprises datanodes 210, 220, and 230. Although only three datanodes are shown in this example, the present disclosure is not limited in this respect and any number of datanodes may be present.

Unlike the database 100 of FIG. 1, database 200 does not include multiple shards of an allocation table. Instead, database 200 comprises a single allocation table 240 which is shared for each datanode 210, 220, and 230.

There are several advantages to the shared everything architecture. Each datanode can access all the data ranges, which eliminates the need for a coordinator node for consolidating results among all datanodes. Furthermore, a datanode can be added and removed without rebalancing the shards. Such scalability is particularly important in a cloud environment, as it allows customers to modify resource provisions easily as their workload varies over time.

However, the shared-everything architecture also presents several challenges. One challenge is page negotiation, described below.

For example, if datanode 210 makes modifications to Page 1, the modifications stay on datanode 210's local copy in memory page cache. Since the other nodes may also have a copy of Page 1 in their own cache, datanode 210 needs to inform all other datanodes about the change in order for the other nodes to get the latest version of Page 1 and refresh their local copy. Also, when there are two or more datanodes that need to modify the same page, then a page negotiation is performed. The page negotiation will block current transactions and increase the average execution time due to the need to lock a page or to fetch the newest version of the page.

Another significant challenge in a shared-everything architecture relates to contention in the data layer. Since all on disk data files are shared, some operations need to be serialized, thereby forcing datanodes to negotiate with each other the order of operations. For example, extensions on a relation may not be done in parallel because the metadata of the relation needs to be updated in between operations.

The present disclosure focuses on the contention in the data layer. More specifically, the present disclosure seeks to provide a solution to the contention related to free space management.

These issues present themselves during the search for free space. Conventionally, a Free Space Map (FSM) is used to record the size of the free space available on each page. In a shared-everything architecture, all nodes consult the same FSM for pages to process their operations, and this results in page sharing and negotiations.

For example, if a first datanode and a second datanode may both determine that page 1 comprises free space after consulting the FSM. Assuming the first datanode obtains ownership of page 1 before the second datanode, the second datanode will need to negotiate with the first datanode before accessing page 1, which increases the execution time of the transaction for the second datanode.

Moreover, since FSM entries with the free space information are stored on FSM pages, any modification to these FSM entries, such as a relation extension which adds more entries to the FSM, or an update to the free space size of a data page, requires an update to the FSM pages, which will cause more page negotiations between nodes.

Therefore, there is provided a method for reducing contention between nodes in free space management and for increasing scalability in a shared everything architecture.

According to at least some embodiments of the present disclosure, these issues are addressed by providing a localized FreeSpaceMap (FSM). For each table, multiple FSMs are used. Thus, instead of a single FSM shared by all datanodes, each datanode is assigned different FSMs.

The solution provided herein aims to address the above issues of contention while ensuring the following properties are respected:

FSM search should be efficient;

FSM should consume free space evenly across different pages;

FSM should not waste pages.

The present disclosure further provides an algorithm for ensuring that multiple FSMs behave like a single FSM.

While the embodiments described herein use an FSM tree structure for implementation, this is provided as an example only and the present disclosure is not limited to a particular structure for the FSM.

Figure 3:
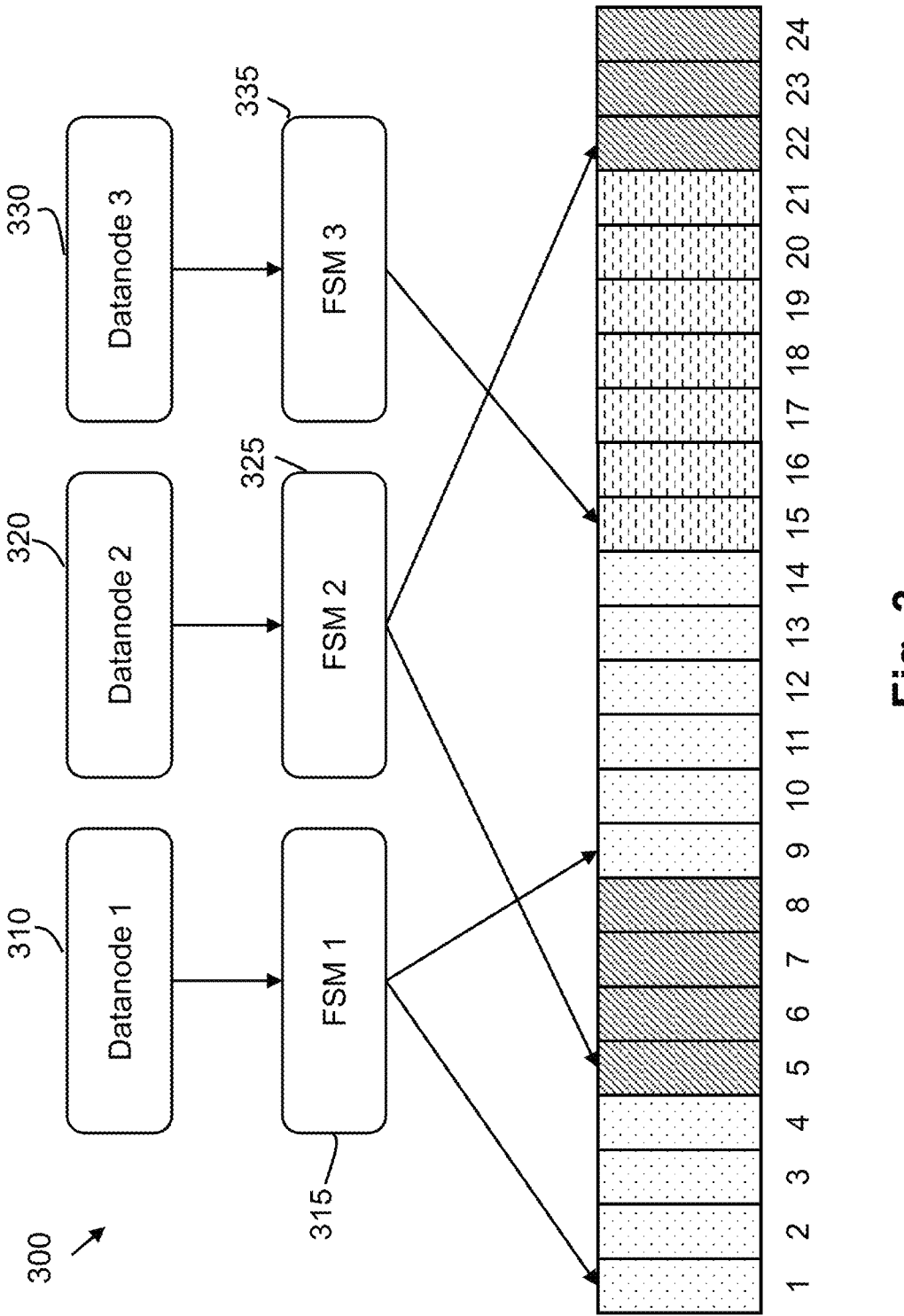
FIG. 3 is a graphical representation of multiple Free Space Maps (FSMs) according to at least some embodiments of the present disclosure.

Reference is now made to FIG. 3, which illustrates a datanodes with multiple FSMs according to at least some embodiments of the present disclosure.

Specifically, as seen in FIG. 3, a database 300 comprises a first datanode 310, a second datanode 320, and a third datanode 330. Datanode 310 is associated to FSM 315, datanode 320 is associated to FSM 325, and datanode 330 is associated to FSM 335.

When a datanode is associated to an FSM in this fashion, a cache of the FSM may be maintained locally by the datanode.

FSMs 315, 325, and 335 point to page allocations for their respective datanodes. For example, pages 1 to 4 and 9 to 14 are allocated to datanode 310 through FSM 315. Similarly, pages 5 to 8 and 22 to 24 are allocated to datanode 320 through FSM 325, and pages 15 to 21 are allocated to datanode 330 through FSM 335.

Accordingly, each datanode may perform operations within its allocated pages without concerns about the operations of other datanodes. Specifically, when a datanode performs an FSM search, it may search its cache of the FSM assigned to it, and when a new page is added during a relation extension, the new page is only added to the FSM that is associated to the current node. The other data nodes, who are not associated to this FSM, do not see the addition of this new page. Therefore, the datanodes to which this FSM is assigned may use new pages more efficiently and with less contention due fewer cross-node page negotiations.

Based on the above, most FSM operations may be performed on the FSM cache. FSM operations from different nodes will be performed on different FSMs, thereby maintaining the efficiency of an FSM search by reducing the need for negotiations. However, when a datanode stops accessing a relation, pages managed by the datanode's FSM may become isolated as other nodes do not have access to them. To address this issue, there is provided a novel FSM assignment and recycling algorithm, described below.

Figure 4:
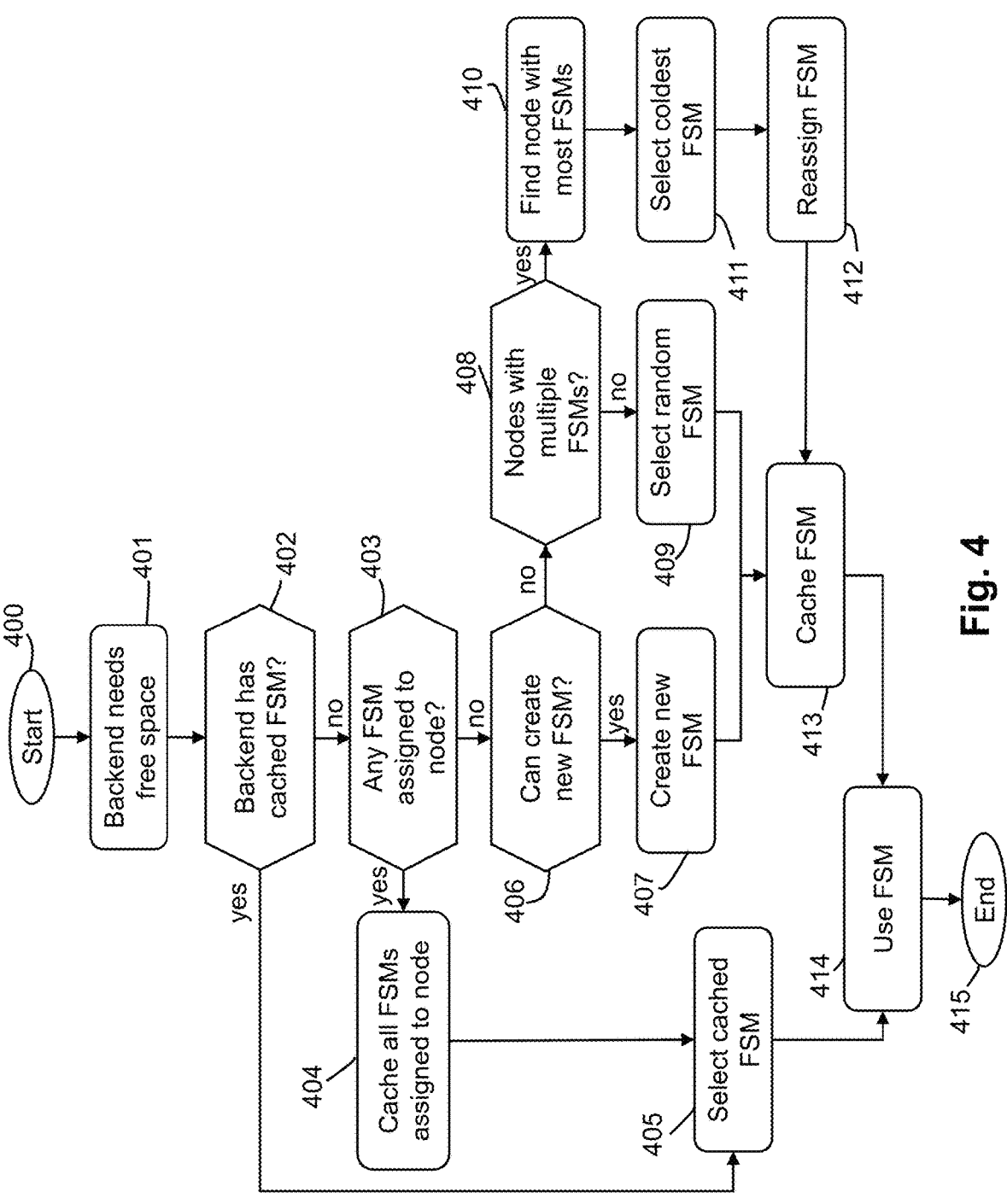
FIG. 4 is a block diagram of a method for assigning FSMs according to at least some embodiments of the present disclosure.

Reference is made to FIG. 4 in which an assignment algorithm according to at least some embodiments of the present disclosure is illustrated.

As seen in FIG. 4, the process starts at block 400 and proceeds to block 401 where it is determined that a datanode needs free space. For example, a datanode may issue a request for free space. The process then proceeds to block 402 where it is determined whether the datanode has cached FSMs. If yes, the process proceeds to block 405 where a cached FSM of the datanode is selected for use. Specifically, as illustrated by block 414, the selected FSM is used to process the free page request. The process then ends at block 415.

On the other hand, if at block 402 it is determined that the datanode does not have cached FSMs, the process proceeds to block 403 where it is determined whether the datanode has any FSMs assigned to it. If yes, the process proceeds to block 404 where all FSMs assigned to the datanode are cached, and then to block 405 where a cached FSM is selected for use. After block 405, the method proceeds to block 414 where the selected FSM is used to process the free page request. The process then ends at block 415.

If on the other hand, it is determined that the datanode does not have FSMs assigned to it at block 403, the process proceeds to block 406 where it is determined whether a new FSM can be created. For example, according to at least some embodiments, there may be structural or resource-based limits to the number of FSMs that are created. Thus, a determination may be made, based on the number of existing FSMs and the number of datanodes, whether a new FSM can be created.

If at block 406 it is determined that new FSMs can be created, the process proceeds to block 407 where a new FSM is created. The process then proceeds to block 413 where the new FSM is cached, and then to block 414 where the new FSM is used to process the free page request. The process then ends at block 415.

If on the other hand at block 406 it is determined that new FSMs cannot be created, the process proceeds to block 408 where it is determined whether there are nodes with multiple FSMs assigned to them. If yes, the process proceeds to block 410 where the datanode with the most FSMs is selected, and then to block 411 where an FSM from this datanode is selected. According to at least some embodiments, the FSM which hasn't been accessed for the longest period (i.e., the "coldest" FSM), is selected. Then, at block 412 the selected FSM is reassigned to the datanode which issued the free page request, and at block 413 the selected FSM is cached.

Then, the process proceeds to block 414 where the selected FSM is used to process the free page request. The process then ends at block 415.

If at block 408 it is determined that there are no nodes with multiple FSMs, the method proceeds to block 409 where an FSM is selected from existing FSMs. For example, an FSM assigned to another node may be selected randomly and shared with the datanode which issued the free page request. Unlike the operation at block 412, the FSM is shared and not reassigned, so that both the datanode which issued the free page request, and the datanode to which this FSM was originally attached, are now both attached to this FSM. The method then proceeds to block 413 where the FSM is cached, and to block 414 where the shared FSM is used to process the free page request. The process then ends at block 415.

As seen from the above, FSMs are created dynamically when needed, namely when the backend of a node with no assigned FSM needs free space. Moreover, the number of FSMs associated to a given relation depends on the access pattern to this relation. If an FSM become vacant later, it will be reassigned to another node with active FSMs based on the process described at FIG. 7 below. Then, since now this node has two FSMs, this FSM may be reassigned based on a free page request, as described with respect to blocks 410, 411, and 412.

Furthermore, in order to eliminate wasted pages, each datanode may be assigned multiple FSMs at the same time. Thus, a datanode may switch to a different FSM when the free space of a current FSM is exhausted.

For example, if FSM 1 and FSM 2 are attached to Node 1, and the backend of Node 1 does not find a suitable page from FSM 1 for a request, the backend may consult FSM 2 for free pages. Simultaneously, FSM 1 may start to extend in the background, thereby eliminating contentions for table extensions from the foreground.

According to at least some embodiments, a relation will observe the following rules:

Information on all FSMs the relation is associated to is recorded in metadata for the table;

When a relation is created by a datanode, an FSM is created for the relation and assigned to the datanode;

When a backend of a datanode reads data from the table, no FSM is created as there is no request for free space;

When a backend of a datanode writes data to the table, if there are any FSMs assigned to the datanode, all the FSMs assigned to the datanode are cached, and one of these FSMs is selected for processing the query;

When a backend of a datanode writes data to the table, if there are no FSMs assigned to the datanode, an FSM is either newly created or reassigned and this FSM is used for processing the query.

Using these rules ensures that a relation, especially a small relation, will not create unnecessary FSMs.

Based on the above, while some benefits are obtained from using localized FSMs for datanodes, this approach also creates challenges. For example, datanodes actively avoid using new pages from FSMs that are not assigned to them as datanodes only search FSMs they are attached to. This could potentially lead to wasting pages and triggering more relation extensions than needed.

To address this issue, there is provided an algorithm that may be executed in the background for checking and reassigning inactive FSMs to active nodes.

Specifically, an FSM may be designated as inactive or cold when the time since the last access to this FSM is greater than a threshold. According to at least some embodiments of the present disclosure, the checking and reassigning of inactive FSMs occurs periodically.

When inactive FSMs are identified for a relation, the background process will reassign the inactive FSMs to nodes who have active access to the relation (i.e. nodes who own active FSMs). According to at least some embodiments, the inactive FSMs are distributed to candidate nodes based on the distribution of free pages. For example, if a first node has more pages in its assigned FSMs than a second node, the first node will be prioritized over the second node.

Figure 5:
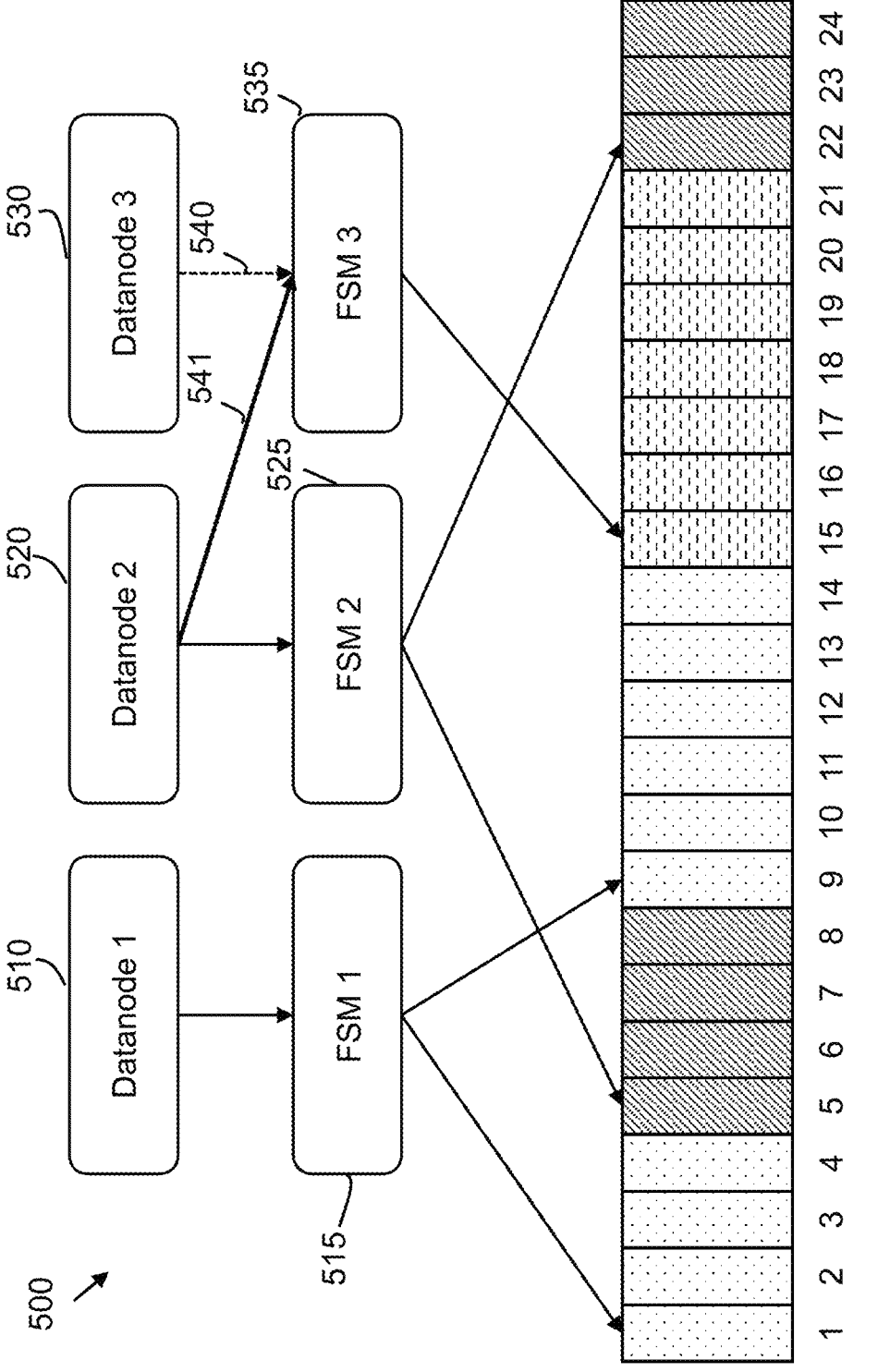
FIG. 5 is a graphical representation of a reassignment of an FSM according to at least some embodiments of the present disclosure.

Reference is now made to FIG. 5, which illustrates the reassignment of an inactive FSM to another datanode. Specifically, as seen in FIG. 5, the database 500 comprises datanode 510, datanode 520, and datanode 530. Initially, datanode 510 is assigned FSM 515, datanode 520 is assigned FSM 525, and datanode 530 is assigned FSM 535. Upon the background process performing a periodic verification, it is determined that FSM 535 is inactive or cold. For example, it may be determined that FSM 535 has not been accessed by datanode 530 for a period greater than a threshold. The threshold may be settable by the user, or be predetermined.

Once it is determined that FSM 535 is inactive, it gets reassigned to another datanode. The datanode to which FSM 535 is reassigned may be determined, in at least some embodiments, based on which data has more pages in its assigned FSMs. Assuming the selected datanode is datanode 520, FSM 535 is reassigned by invalidating the association 540 between datanode 530 and FSM 535, and by creating a new association 541 between datanode 520 and FSM 535.

Figure 6:
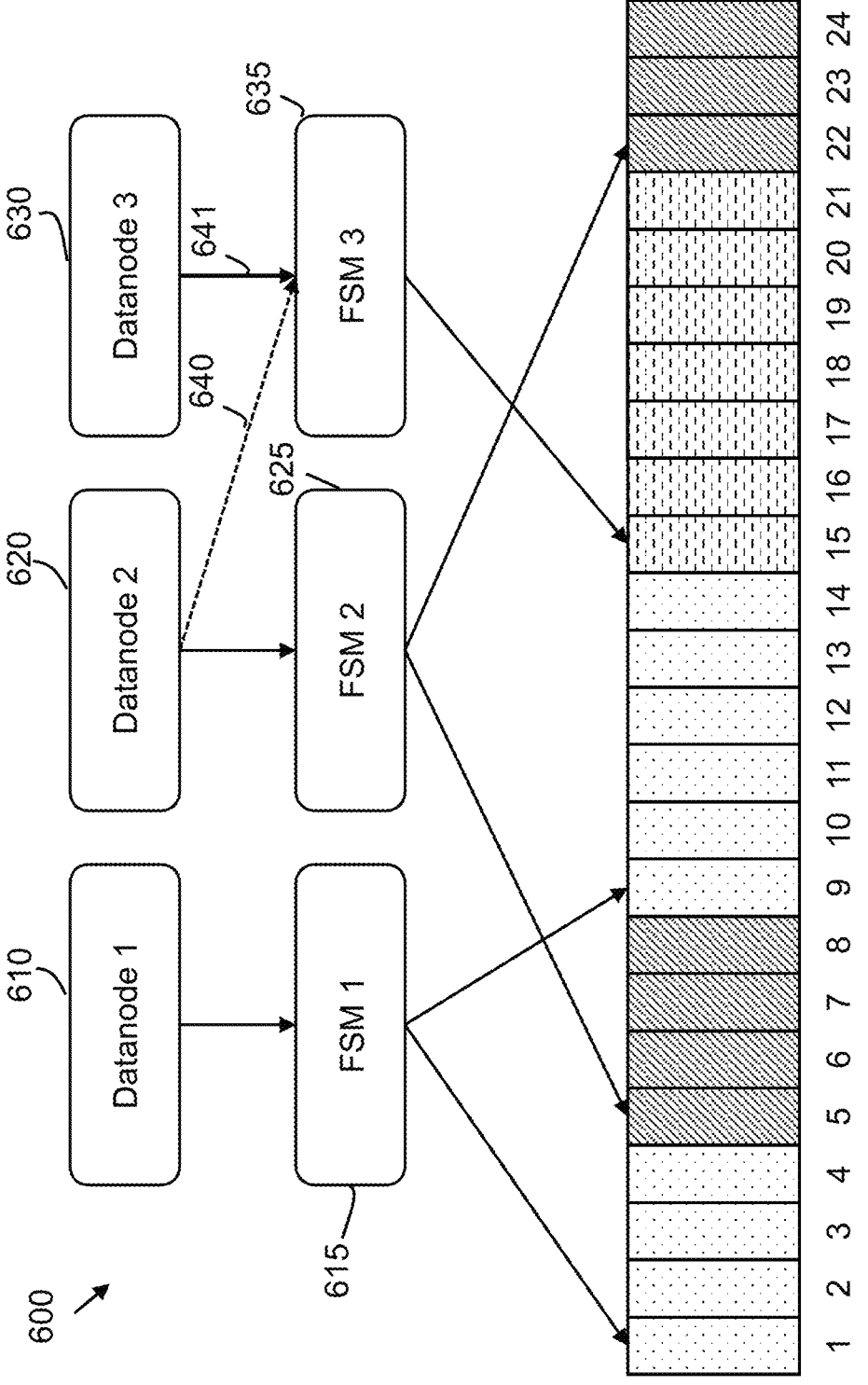
FIG. 6 is a graphical representation of a reassignment of an FSM according to at least some embodiments of the present disclosure.

Reference is now made to FIG. 6, which illustrates a reassignment of an FSM for a datanode to which no FSM is initially assigned.

As seen in FIG. 6, the database 600 comprises datanode 610, datanode 620, and datanode 630. Initially, datanode 610 is assigned FSM 615, datanode 620 is assigned FSM 625 and FSM 635, and datanode 630 does not have any FSMs assigned to it. When datanode 630 needs an FSM to process a free space request, a search for the datanode with the most assigned FSMs is performed. In the scenario of FIG. 6, this search identifies datanode 620 as having the most assigned FSMs.

The coldest FSM from datanode 620 is then identified for reassignment. Assuming in this case that the coldest FSM for datanode 620 is FSM 635, FSM 635 is reassigned to datanode 630. Specifically, FSM 635 is reassigned by invalidating association 640 between datanode 620 and FSM 635, and creating a new association 641 between datanode 630 and FSM 635.

Figure 7:
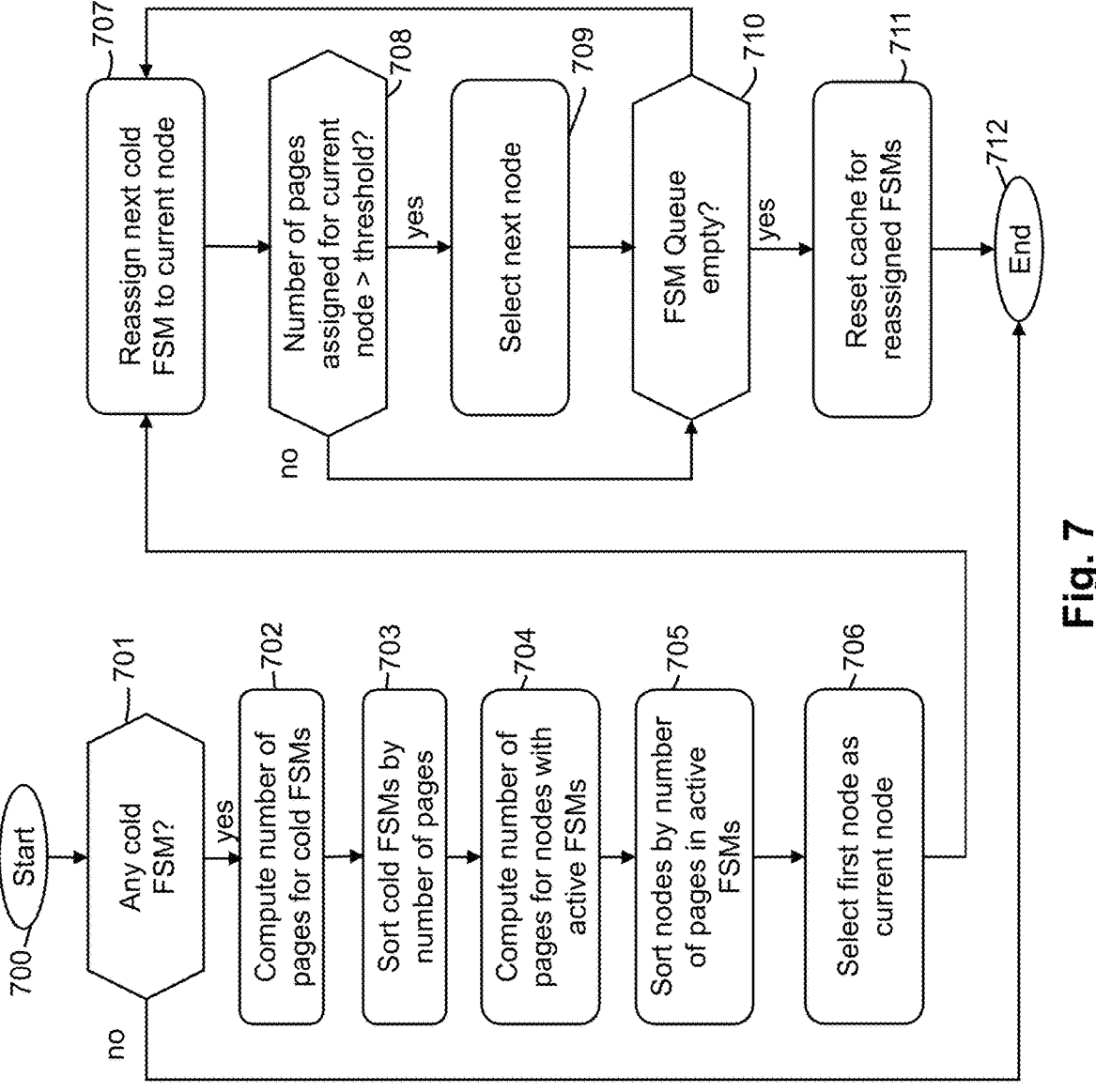
FIG. 7 is a block diagram of a method for recycling FSMs according to at least some embodiments of the present disclosure.

Reference is now made to FIG. 7, which illustrates a method for recycling inactive or cold FSMs according to at least some embodiments of the present disclosure. The process of FIG. 7 runs as a background thread on the database. In at least some embodiments, this background thread may run continuously, or periodically.

As seen in FIG. 7, the process starts at block 700 and proceeds to block 701 where it is checked whether there are any inactive or cold FSMs. As previously described, an inactive or a cold FSM is an FSM which has not been accessed by any datanode for a period greater than a threshold. The threshold may be configurable by a user or predetermined.

If there are no cold FSMs, as determined at block 701, the process ends at block 711. On the other hand, if there are cold FSMs identified, the process proceeds to block 702 where the number of pages per cold FSM is determined. Specifically, for each cold FSM identified at block 701, the number of pages owned by the FSM is determined.

The process then proceeds to block 703 where the cold FSMs are sorted based on the number of pages owned by each cold FSM. The process then proceeds to block 704 where the number of pages owned by datanodes with active FSMs are determined. Specifically, for each datanode associated to at least one active FSM, the number of pages owned by the datanode is determined. A page is deemed to be owned by a datanode when the FSM containing the information of this page is assigned to this datanode. The process then proceeds to block 705 where the datanodes are sorted based on the number of pages determined at block 704.

The process then proceeds to block 706 where the datanode with the most pages, as determined at block 705, is selected as the current datanode. The FSM with the most pages, as determined at step 703, is then assigned to the current datanode at block 707. The process then proceeds to block 708 where it is determined whether a threshold number of pages were assigned to the current data node. For example, in some embodiments, a maximum number of pages may be added to a datanode during the recycling process. The maximum number may be a constant for each datanode, or the maximum number may be a number which is specific to each datanode. According to at least one embodiment, the maximum number of pages assigned to a datanode is proportional to the number of pages owned by the datanode. According to at least another embodiment, the maximum number maybe computed using Equation 1:

$$N_{max} = \frac{N_{node}}{N_{all}} N_{rec} \tag{1}$$

In Equation 1, $N_{max}$ is the maximum number of pages to be added to a datanode, $N_{node}$ is the number of pages owned by the datanode at the beginning of the process, $N_{all}$ is the total number of pages owned by all datanodes, and $N_{rec}$ is the total number of pages from FSMs that are being reassigned.

If the number of FSMs assigned to the current datanode is below the threshold, the process proceeds to block 710 where it is determined whether all cold FSMs have been assigned. If all cold FSMs have been assigned, the process proceeds to block 711 where the cached information on all nodes for FSMs that have been reassigned is cleared, and the process ends at block 712. If all cold FSMs have not been assigned, the process returns to block 707 to assign the next FSM to the current datanode.

If on the other hand, the number of pages assigned to the current data node is determined to be at the threshold at block 708, the process proceeds to block 709 where the next datanode with the most pages, as determined at block 705, is selected as the current datanode. The process then proceeds to block 710 where it is determined whether all cold FSMs have been assigned. If all cold FSMs have been assigned, the process proceeds to block 711 where the cached information on all nodes for FSMs that have been reassigned is cleared, and the process ends at block 712. If all cold FSMs have not been assigned, the process then returns to block 707 using the newly selected current datanode.

Accordingly, the method illustrated at FIG. 7 is used to ensure inactive or cold FSMs are reassigned to other datanodes, thereby solving the problem of isolated FSMs.

Figure 8:
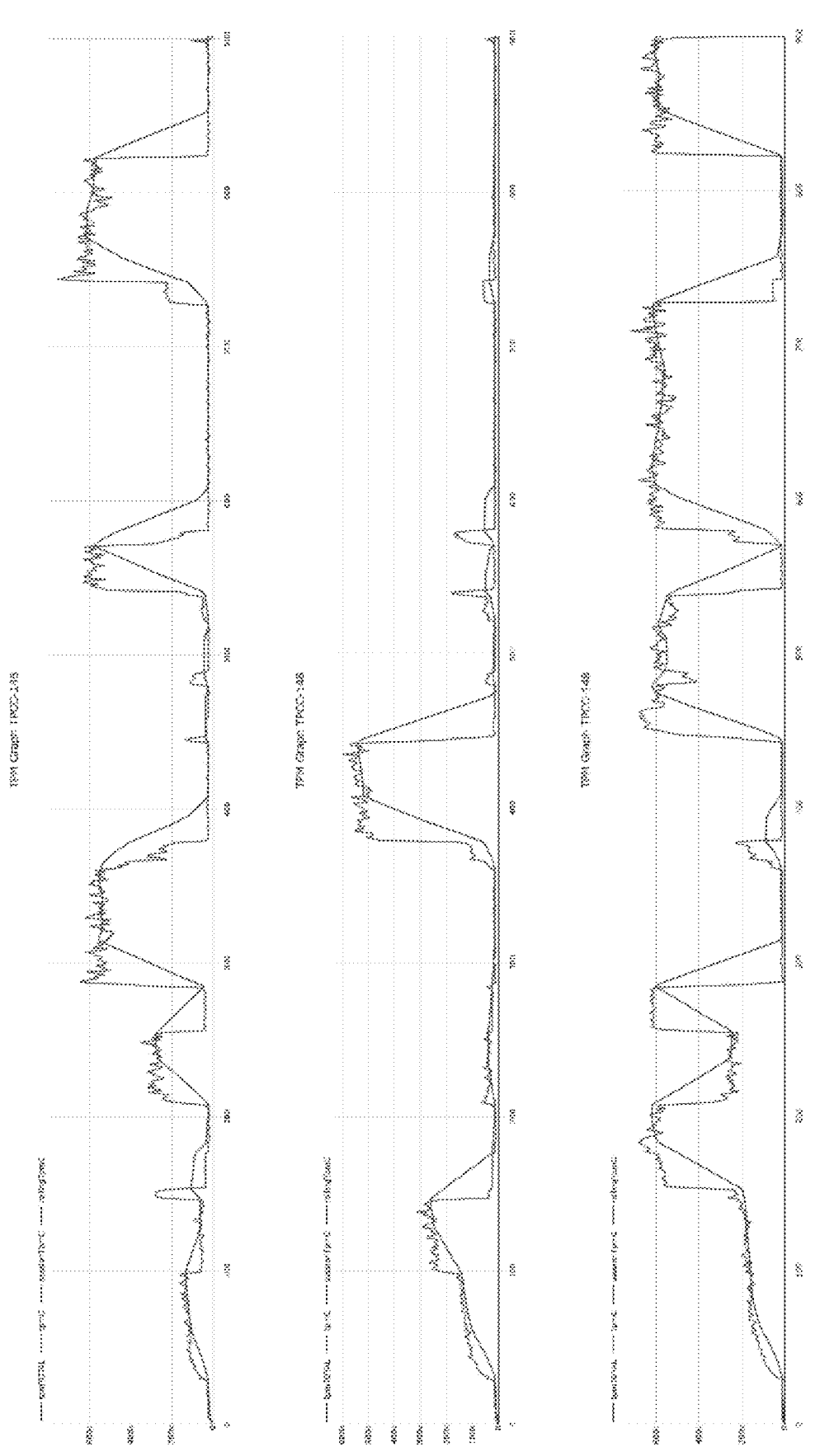
FIG. 8 is a performance graph of a conventional distributed database.

Reference is now made to FIG. 8, which shows a performance graph of a conventional distributed database with a shared-everything architecture. The graph in FIG. 8 shows transactions per minute (TPM) as a function of time as well as the rolling average TPM as a function of time for three different datanodes of the database. As can be observed from FIG. 8, the TPM is very low during some periods of time and high during some other periods. The TPM is low during some periods because of negotiations between datanodes as contention over resources occur.

Figure 9:
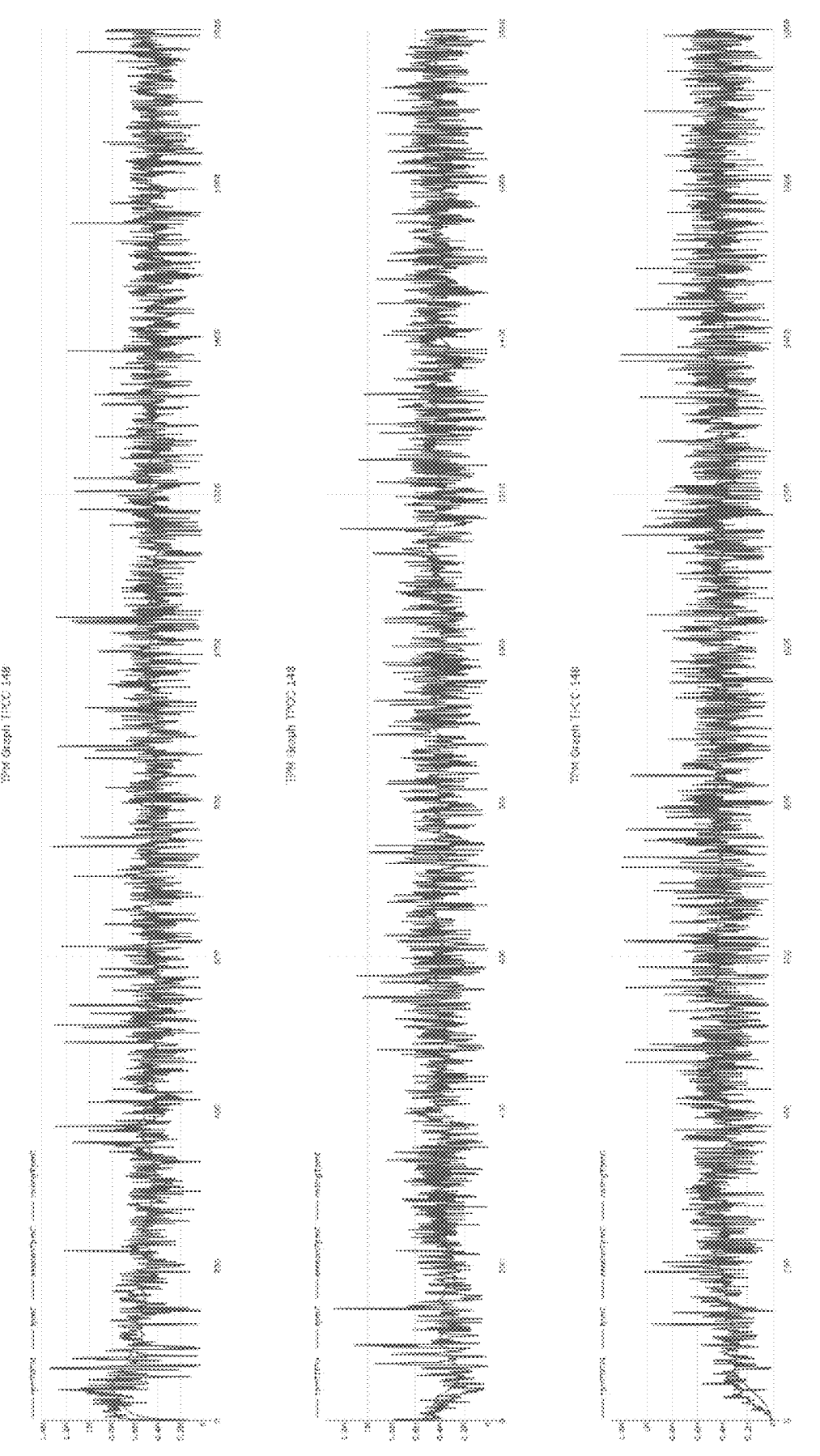
FIG. 9 is a performance graph of a distributed database according to an embodiment of the present disclosure.

Reference is now made to FIG. 9, which shows a performance graph of a distributed database implementing the dynamic allocation of FSMs and recycling of FSMs according to an embodiment of the present disclosure. As in FIG. 8, the graph of FIG. 9 shows TPM as a function of time as well as the rolling average TPM as a function of time for three. In FIG. 9, the performance of the database is generally constant over time as compared to the performance of the conventional database shown in FIG. 8.

For both FIG. 8 and FIG. 9, the performance of the databases was measured based on standardized benchmark TPC-C running on ARM EulerOS release 2.0 (SP8), with 3 datanodes with 200 GB of shared buffers each on the same server, 600 warehouses, 200 terminals for each datanode, and a 30 minute execution time.

Figure 10:
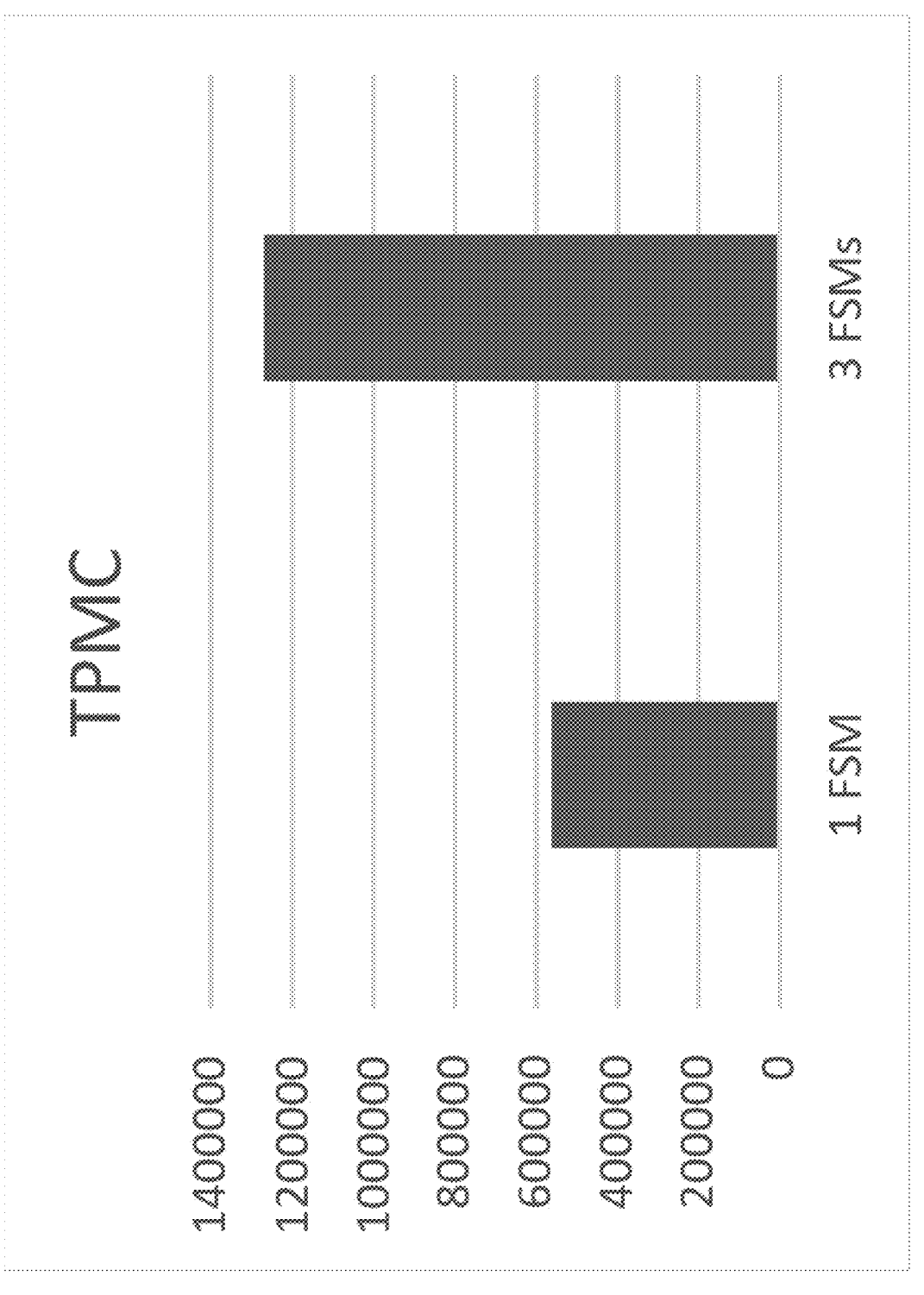
FIG. 10 is a bar graph comparing performance between a conventional distributed database and a database according to an embodiment of the present disclosure.

Reference is now made to FIG. 10, which compares the performance of a conventional distributed database with one FSM per relation, shared by 3 datanodes, and a distributed database according to the present disclosure in which each datanode is assigned its own FSM. As can be seen from FIG. 10, the performance of the distributed database with three distinct FSMs is superior.

Figure 11:
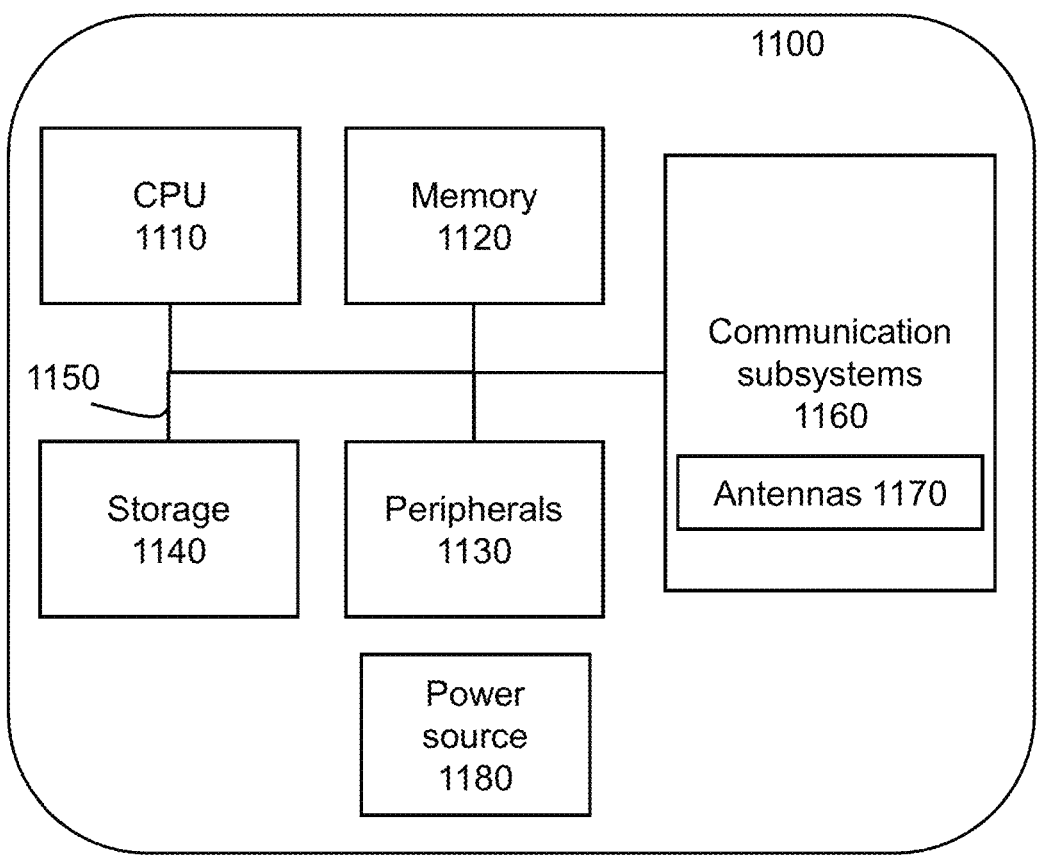
FIG. 11 is a block diagram of an exemplary computing device for implementing embodiments of the present disclosure.

The above functionality may be implemented on any one or combination of computing devices. FIG. 11 is a block diagram of a computing device 1100 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1100 may comprise a central processing unit (CPU) 1110, memory 1120, a mass storage device 1140, and peripherals 1130. Peripherals 1130 may comprise, amongst others one or more input/output devices, such as a speaker, microphone, mouse, touchscreen, keypad, keyboard, printer, display, network interfaces, and the like. Communications between CPU 1110, memory 1120, mass storage device 1140, and peripherals 1130 may occur through one or more buses 1150.

The bus 1150 may be one or more of any type of several bus architectures including a memory bus or memory controller, a peripheral bus, video bus, or the like. The CPU 1110 may comprise any type of electronic data processor. The memory 1120 may comprise any type of system memory such as static random-access memory (SRAM), dynamic random-access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage device 1140 may comprise any type of storage device configured to store data, programs, and other information and to make the data, programs, and other information accessible via the bus. The mass storage device 1140 may comprise, for example, one or more of a solid-state drive, hard disk drive, a magnetic disk drive, an optical disk drive, or the like.

The computing device 1100 may also include one or more network interfaces (not shown), which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network, for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for managing free space in a distributed database, comprising:

issuing a request for a page from a first datanode of the distributed database;

determining that the first datanode is not associated to a free space map that can fulfill the request, wherein free space maps track free space on data pages of the distributed database;

selecting a free space map from a plurality of free space maps, each of the plurality of free space maps being associated to other datanodes of the distributed database;

associating the selected free space map to the first datanode;

responding to the request based on the selected free space map; and executing a recycling algorithm, the recycling algorithm comprising:

identifying inactive free space maps within the distributed database, the inactive free space maps having a time since last access greater than a threshold;

identifying active datanodes of the distributed database, the active datanodes being associated to free space maps having a time since last access less than the threshold; and associating the inactive free space maps to the active datanodes.

2. The method of claim 1, wherein the determining comprises finding that the first datanode is not associated to any free space map.

3. The method of claim 1, wherein the determining comprises finding that the first datanode is associated to a free space map which is full.

4. The method of claim 1, wherein the selecting comprises:

finding that none of the other datanodes is associated to multiple free space maps;

choosing a second datanode randomly from the other datanodes;

wherein the selected free space map is associated to the second data node.

5. The method of claim 1, wherein the selecting comprises:

finding that at least one of the other datanodes is associated to multiple free space maps;

choosing a second datanode from the other datanodes, the second datanode being associated to a highest number of free space maps;

wherein the selected free space map is a free space map associated the second datanode having an earliest time of last access.

6. The method of claim 5, further comprising disassociating the selected free space map from the second datanode.

7. The method of claim 1, the recycling algorithm further comprising:

sorting inactive free space maps by number of pages owned by each of the inactive free space maps;

sorting the active datanodes by number of pages owned by free space maps associated to each of the active datanodes;

selecting a current datanode of the active datanodes, wherein the current datanode has the most pages of the active datanodes;

wherein the associating comprises associating a free space map with the most pages of the inactive free space maps with the current datanode.

8. The method of claim 7, the recycling algorithm further comprising:

determining that a maximum number of free space maps have been assigned to the current datanode; and changing the current datanode to the next datanode with the most pages of the active datanodes.

9. The method of claim 8, wherein the maximum number is proportional to a number of pages of the current datanode.

10. The method of claim 1, wherein the recycling algorithm is executed as a background thread.

11. The method of claim 1, wherein the recycling algorithm is executed periodically or continually.

12. A computing device for managing free space in a distributed database, comprising:

a processor; and memory;

wherein the computing device is configured to:

issue a request for a page from a first datanode of the distributed database;

determine that the first datanode is not associated to a free space map that can fulfill the request, wherein free space maps track free space on data pages of the distributed database;

select a free space map from a plurality of free space maps, each of the plurality of free space maps being associated to other datanodes of the distributed database;

associate the selected free space map to the first datanode;

respond to the request based on the selected free space map; and execute a recycling algorithm, the recycling algorithm comprising:

identifying inactive free space maps within the distributed database, the inactive free space maps having a time since last access greater than a threshold;

identifying active datanodes of the distributed database, the active datanodes being associated to free space maps having a time since last access less than the threshold; and associating the inactive free space maps to the active datanodes.

13. The computing device of claim 12, wherein the determining comprises finding that the first datanode is not associated to any free space map.

14. The computing device of claim 12, wherein the determining comprises finding that the first datanode is associated to a free space map which is full.

15. The computing device of claim 12, wherein the selecting comprises:

finding that none of the other datanodes is associated to multiple free space maps;

choosing a second datanode randomly from the other datanodes;

wherein the selected free space map is associated to the second data node.

16. The computing device of claim 12, wherein the selecting comprises:

finding that at least one of the other datanodes is associated to multiple free space maps;

choosing a second datanode from the other datanodes, the second datanode being associated to a highest number of free space maps;

wherein the selected free space map is a free space map associated the second datanode having an earliest time of last access.

17. The computing device of claim 12, further configured to disassociate the selected free space map from the second datanode.

18. The computing device of claim 12, the recycling algorithm further comprising:

sorting inactive free space maps by number of pages owned by each of the inactive free space maps;

sorting the active datanodes by number of pages owned by free space maps associated to each of the active datanodes;

selecting a current datanode of the active datanodes, wherein the current datanode has the most pages of the active datanodes;

wherein the associating comprises associating a free space map with the most pages of the inactive free space maps with the current datanode.

19. The computing device of claim 18, the recycling algorithm further comprising:

determining that a maximum number of free space maps have been assigned to the current datanode; and changing the current datanode to the next datanode with the most pages of the active datanodes.

20. The computing device of claim 19, wherein the maximum number is proportional to a number of pages of the current datanode.

21. The computing device of claim 12, wherein the recycling algorithm is executed as a background thread.

22. The computing device of claim 12, wherein the recycling algorithm is executed periodically or continually.

23. A non-transitory computer readable medium having stored thereon executable code for execution by a processor of a computing device, the executable code comprising instructions for:

issuing a request for a page from a first datanode of the distributed database;

determining that the first datanode is not associated to a free space map that can fulfill the request, wherein free space maps track free space on data pages of the distributed database;

selecting a free space map from a plurality of free space maps, each of the plurality of free space maps being associated to other datanodes of the distributed database;

associating the selected free space map to the first datanode;

responding to the request based on the selected free space map; and executing a recycling algorithm, the recycling algorithm comprising:

identifying inactive free space maps within the distributed database, the inactive free space maps having a time since last access greater than a threshold;

identifying active datanodes of the distributed database, the active datanodes being associated to free space maps having a time since last access less than the threshold; and associating the inactive free space maps to the active datanodes.

* * * * *